(12) United States Patent
Liu et al.

(10) Patent No.: US 7,753,048 B2
(45) Date of Patent: Jul. 13, 2010

(54) SOLAR AIR CONDITIONING DEVICE

(75) Inventors: Tay-Jian Liu, Taipei Hsien (TW);
Xin-Jian Xiao, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 557 days.

(21) Appl. No.: 11/776,906

(22) Filed: Jul. 12, 2007

(65) Prior Publication Data
US 2008/0248737 A1     Oct. 9, 2008

(30) Foreign Application Priority Data
Apr. 6, 2007     (CN) ......................... 2007 1 0073968

(51) Int. Cl.
*F24J 2/04* (2006.01)
(52) U.S. Cl. .................. 126/569; 126/445; 126/705; 126/628; 126/629; 126/634; 454/237; 138/117
(58) Field of Classification Search ................. 126/569, 126/628, 629, 705, 658, 621; 454/237; 138/117
See application file for complete search history.

(56) References Cited

U.S. PATENT DOCUMENTS

| 4,392,483 A | * | 7/1983 | Koenig | ....................... 126/650 |
| 4,607,616 A | * | 8/1986 | Lehmann | ..................... 126/669 |
| 6,880,553 B2 | * | 4/2005 | Liu et al. | ..................... 126/628 |
| 7,661,422 B2 | * | 2/2010 | Liu et al. | ..................... 126/629 |
| 2002/0032000 A1 | * | 3/2002 | Lawless et al. | .............. 454/365 |

FOREIGN PATENT DOCUMENTS

TW         579416         3/2004

* cited by examiner

*Primary Examiner*—Steven B McAllister
*Assistant Examiner*—Nikhil Mashruwala
(74) *Attorney, Agent, or Firm*—Jeffrey T. Knapp

(57) ABSTRACT

A solar air conditioning device (100) comprises a solar collector assembly (30), an inlet assembly (10) at an entrance of the solar collector assembly, and an outlet assembly (50) at an exit of the solar collector assembly. The solar collector assembly includes a heat-absorbing set (31) and a transparent panel (38) being assembled to a top of the heat-absorbing set. The heat-absorbing set comprises a plurality of heat-absorbing units (32) engaged with each other. The heat-absorbing set defines an air channel with the transparent panel and a heat-absorbing channel below the air channel. The inlet and outlet assemblies are in fluidic communication with the heat-absorbing channel.

8 Claims, 18 Drawing Sheets

SOLAR AIR CONDITIONING DEVICE

BACKGROUND OF THE INVENTION

1. Field of the Invention

The present invention relates to air conditioning devices, and particularly, to an air conditioning device using solar energy to heat air.

2. Description of Related Art

With increasing $CO_2$ emissions, the risk of global climate becomes abnormal and ecological destruction may increase. As a result, industrialized countries have again become aware of the urgency to reduce their dependence on fossil fuels after the energy crisis in the 70's. Therefore, it has become important to develop new environmental friendly energy resources, and to replace devices using non-renewable energy resources, such as air-conditioners, with devices using renewable energy. The conventional air conditioning devices not only need more energy, but also require refrigerant which can be harmful to the environment. Consequently, these countries have given positive commitments to use solar energy more effectively. Though people still have reservations about whether solar energy will be able to replace other energy resources in the near future, one thing that is almost certain is that solar energy will be playing a very important role in a number of fields, especially air ventilation and heating in structures such as buildings and vehicles.

As far as an air conditioning device using solar energy for heating and air ventilation is concerned, solar collectors are a key part in such a device, and it has to be mounted at an outside location where sufficient sunlight can be collected, such as on a roof or wall. In the past, a lot of effort has been made to develop solar collectors with different functions and styles. Many of them have been disclosed in patent literature. The most typical example is fixing a glass panel or transparent panel onto a fixed outer frame of a heat-insulated chamber and passing fluid through black heat-absorbing plates or pipes installed inside the chamber, so as to absorb solar energy. Examples include the solar hot water supply system disclosed in U.S. Pat. No. 4,418,685, the air ventilation facility disclosed in WO 9,625,632, the roof-style air ventilation facility disclosed in US No. 2002/0,032,000A1, and the wall-style air preheater disclosed in U.S. Pat. No. 4,934,338. However, the solar collectors used presently still have some drawbacks. Therefore, there is much room for improvements in applying and promoting the usage of solar energy to save energy and facilitate air conditioning. The aforementioned drawbacks include:

(1) The related solar collector is too heavy. Its long-term use may cause an overly heavy load on the bearing structure.
(2) Solar-thermo conversion efficiency may be limited.
(3) The structure of the related solar collector is complicated, which makes its installation and maintenance difficult. And thus prolongs the return period.
(4) The related solar heating device has poor compatibility and flexibility to match different bearing structures. Very often, it has to be custom-made.
(5) The contour of the solar collector is obtrusive and often impairs the aesthete and harmony of the overall appearance of the bearing structure.
(6) The packaging needed for the collector takes up much space and increases the cost of storage, display, and marketing.
(7) The integral assembly of the whole-unit product is bulky, making it difficult to use in large-area application and increases installation cost.
(8) Glass or transparent panels are glazed onto the outer frame of a heat-insulated chamber. Different thermal expansion coefficients of materials may cause thermal stress problems.
(9) The related design is so complicated as to be difficult for an untrained user to install.
(10) Some of the related designs can only be applicable to the structures which are under construction and designed to allow its installation. For most existing structures, the designs are unsuitable.
(11) When air passes over a glazed panel, heat is dissipated unless double-glazing is used, but it is expensive and troublesome.
(12) Hot water supply systems or liquid systems operated by solar heating experience problems due to freezing and leakage of the working liquid.

Related solar air conditioning devices include that disclosed in U.S. Pat. No. 6,880,553. Heat-absorbing units of the solar air conditioning device of U.S. Pat. No. 6,880,553 are connected in a fixed way, however it is difficult to extend the area of the solar air conditioning device in a convenient way so that the solar air conditioning device can be used in different applications.

It is therefore desirable to provide a solar air conditioning device that can be flexibly extended and used in different applications.

SUMMARY OF THE INVENTION

A solar air conditioning device comprises a solar collector assembly, an inlet assembly installed at an entrance of the solar collector assembly, and an outlet assembly installed at an exit of the solar collector assembly. The solar collector assembly includes a heat-absorbing set and a transparent panel being assembled to a top of the heat-absorbing set. The heat-absorbing set comprises a plurality of heat-absorbing units. The heat-absorbing units are engaged with each other.

The heat-absorbing units can be assembled together in a flexible way via engaging members and clips. Thus, the solar air conditioning assembly can be used in many different applications.

The solar air conditioning device can heat stale air guided from exhaust pipes connecting with a room requiring cooling and expel the hot stale air out of the structure by thermal buoyancy. Cool and fresh air outside can be guided to the room requiring cooling, or air from outside can be cooled and guided into the room requiring cooling. Thus, the solar air conditioning device can be used as an air conditioning system.

According to concept of a modular design, the solar air conditioning assembly provides users with a boarder range of applications. Moreover, the solar air conditioning assembly provides users with more selection and freedom in assembly. The solar air conditioning assembly can be installed horizontally or vertically attached to walls. Furthermore, it can be installed obliquely. The solar air conditioning assembly can also provide excellent heat insulation and protection to structures.

The heat-absorbing units used in the solar air conditioning assembly can be flexibly expanded as desired to the most optimal absorption surface areas to fully absorb and collect energy. Therefore, the solar air conditioning assembly does not need a fixed outer frame insulation chamber like the one used in the related solar air conditioning assembly. The solar air conditioning assembly also needs no special consideration for the heat efficiency of each individual unit, as related models do.

The solar air conditioning assembly only need one layer of transparent panel; because most of the air goes through the lower heat-absorbing channels, the assembly has the excellent insulation effect of a double-glazed system and a very high heat-absorption efficiency.

The solar air conditioning assembly is designed according to a modular concept. Cost of the solar air conditioning assembly is greatly reduced as the heat-absorbing units are made of thin boards and plates. The solar air conditioning assembly is much simpler than the related assemblies with a one piece unit design. The assembly not only reduces cost in packaging but also requires less room for display and storage thus making marketing much easier. The solar air conditioning assembly is very easy to install and maintain, so users can install or assemble the system by themselves.

The solar air conditioning assembly is operated and powered by solar energy and therefore does not rely on an electrical power source and does not need a refrigerant. Furthermore, the solar air conditioning assembly having modular heat-absorbing units can be increased in size to fit different conditions and function requirements.

Other advantages and novel features of the present invention will become more apparent from the following detailed description of preferred embodiment when taken in conjunction with the accompanying drawings.

BRIEF DESCRIPTION OF THE DRAWINGS

Many aspects of the present solar air conditioning device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
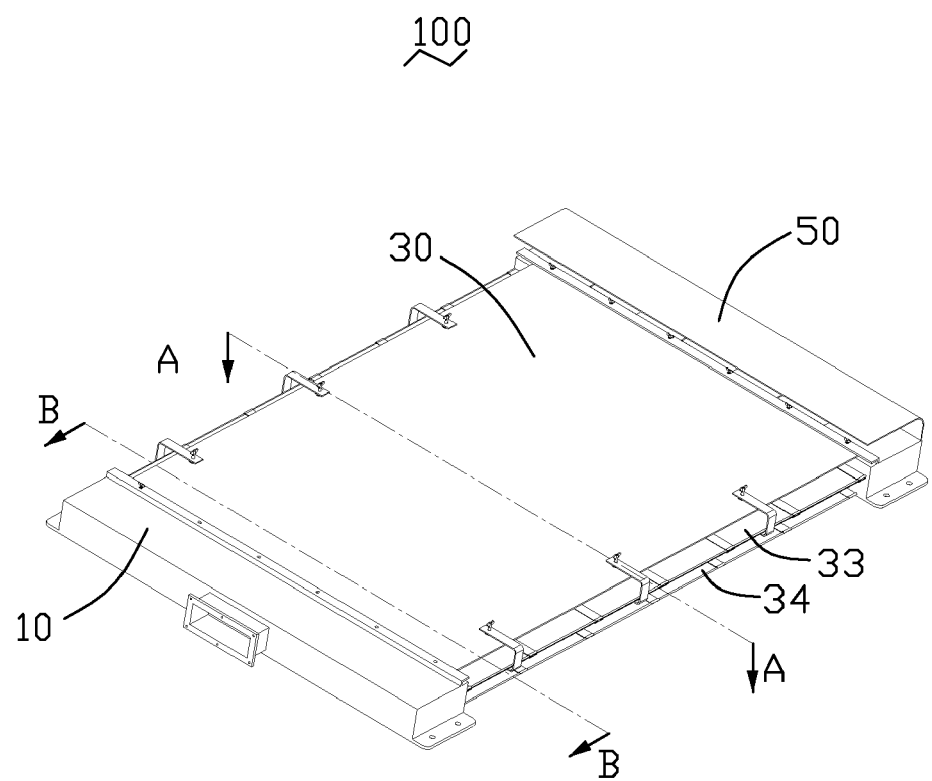
FIG. 1 is an assembled, schematic view of a solar air conditioning device in accordance with the preferred embodiment of the present invention.
Figure 2:
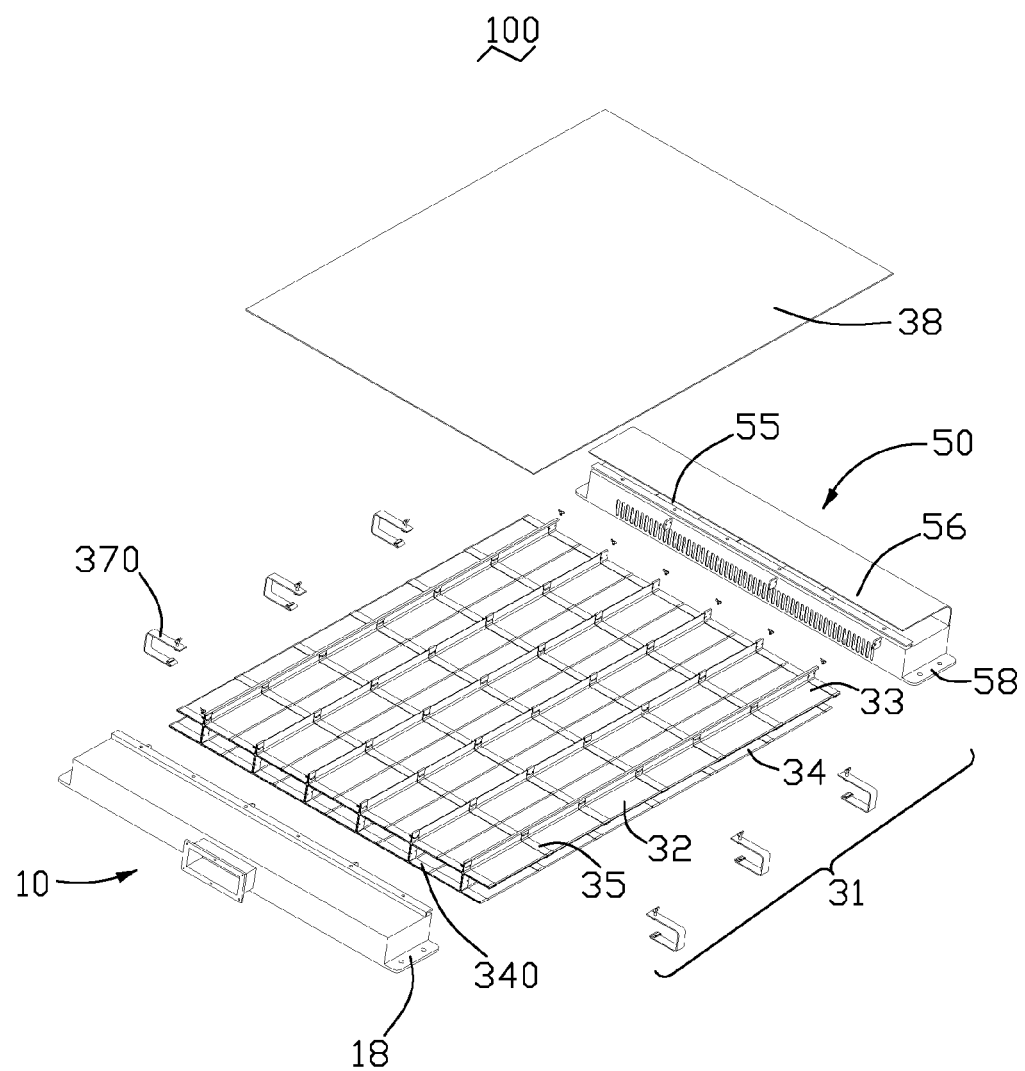
FIG. 2 is an exploded, schematic view of the solar air conditioning device in FIG. 1.

Referring to FIG. 1 and FIG. 2, a solar air conditioning device 100 in accordance with the present invention is shown. The air conditioning device 100 comprises a solar collector assembly 30, an inlet assembly 10, and an outlet assembly 50. The solar collector assembly 30 comprises a heat-absorbing set 31 and a transparent panel 38. The heat-absorbing set 31 has a plurality of heat-absorbing channels 340. The heat-absorbing set 31 is used for absorbing solar energy to heat air through the heat-absorbing channels 340. The heat-absorbing set 31 comprises a plurality of modular heat-absorbing units 32 which are connected with each other. The heat-absorbing units 32 are made of good thermal conductivity materials with black surface. The heat-absorbing units 32 are manufactured by aluminum extrusion. Then they are subjected to surface treatment of anode oxidation and black coloring. The solar collector assembly 30 defines a plurality of upper heat-retention cavities 33 and a plurality of lower heat-absorbing cavities 34 by the heat-absorbing units 32 and the transparent panel 38.

Figure 3:
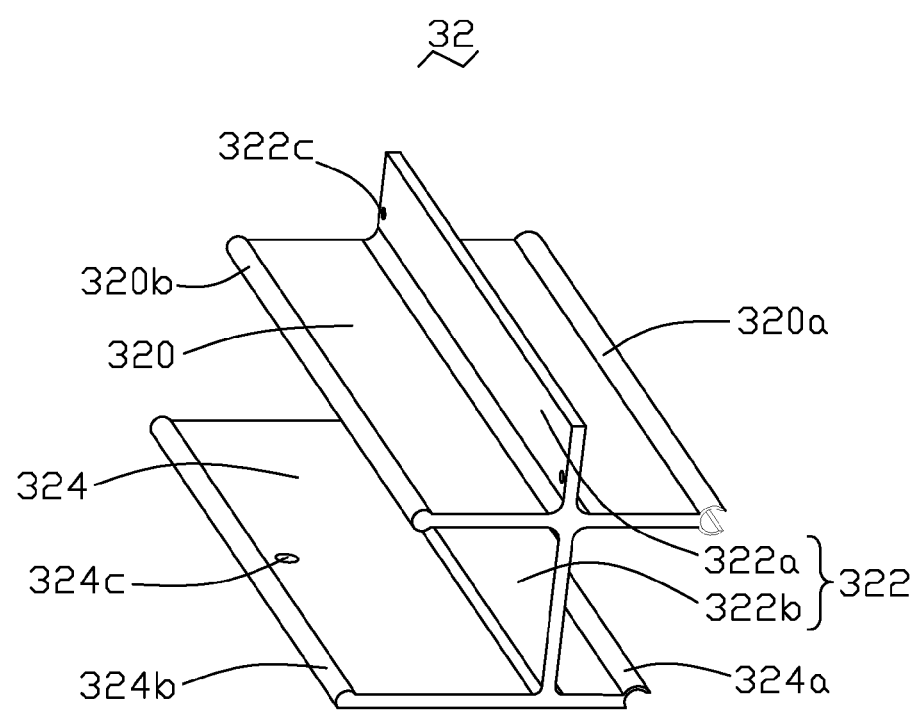
FIG. 3 is a schematic view of a heat-absorbing unit used in the air conditioning device in FIG. 1.

Referring to FIG. 3, a heat-absorbing unit 32 of the air conditioning device 100 is shown. The heat-absorbing unit 32 comprises a heat-absorbing plate 320, a bottom board 324 and a support board 322 integrally formed from a piece of aluminum stock. The support board 322 is vertically connected with the heat-absorbing plate 320 and the bottom board 324. The support board 322 is divided into an upper support board 322a above the heat-absorbing plate 320 and a lower support board 322b below the heat-absorbing plate 320. The heat-absorbing units 32 are thin and handy for displaying, packaging, storage, transportation and assembly. The heat-absorbing plate 320 in a side of the support board 322 can be designed to have a different transverse length and a same longitudinal length to that of the bottom board 324 on a same side. Two mounting holes 322c are respectively defined in two longitudinal sides of the upper support board 322a. A mounting hole 324c is defined in a left side of the bottom board 324. The heat-absorbing unit 32 can be mounted on a roof (not shown) or a fixed surface (not shown) by means of a screw (not shown) extending through the mounting hole 324c and screwing in the roof or the fixed surface.

For conveniently increasing quantity of the heat-absorbing units 32 included in the solar collector assembly 30, each heat-absorbing unit 32 further comprises two fasteners 320a, 320b and two fixtures 324a, 324b. The fasteners 320a, 320b are formed from two opposite sides of the heat-absorbing plate 320. The fixtures 324a, 324b are formed from two opposite sides of the bottom board 324. The fastener 320a and the fixture 324a are shaped to be curved grooves. The fastener 320b and the fixture 324b, which can be respectively engaged with the fastener 320a and the fixture 324a of an adjacent heat-absorbing unit 32, are shaped to be curved rods. Accordingly, the heat-absorbing units 32 are engaged with each other by means of the fasteners 320a, 320b and the fixtures 324a, 324b, thus forming a transverse row of heat-absorbing units 32. Furthermore, a plurality of clips 35 are provided for connecting the heat-absorbing units 32 along a longitudinal direction.

Figure 3A:
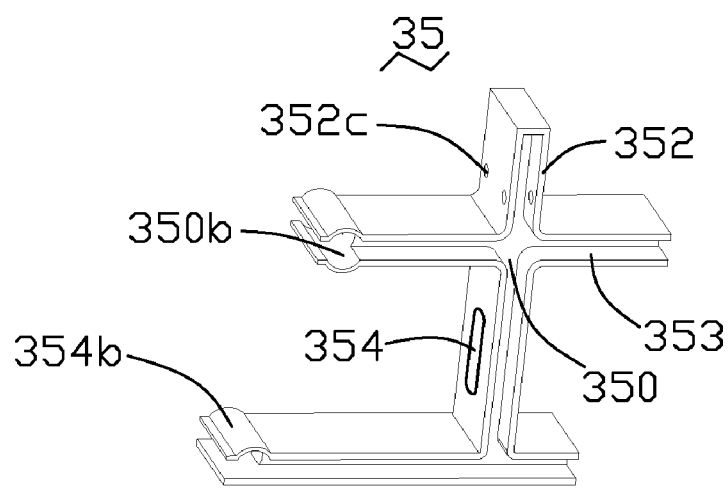
FIG. 3(A) is a schematic view of a clip for engaging with the heat-absorbing unit in FIG. 3.
Figure 3B:
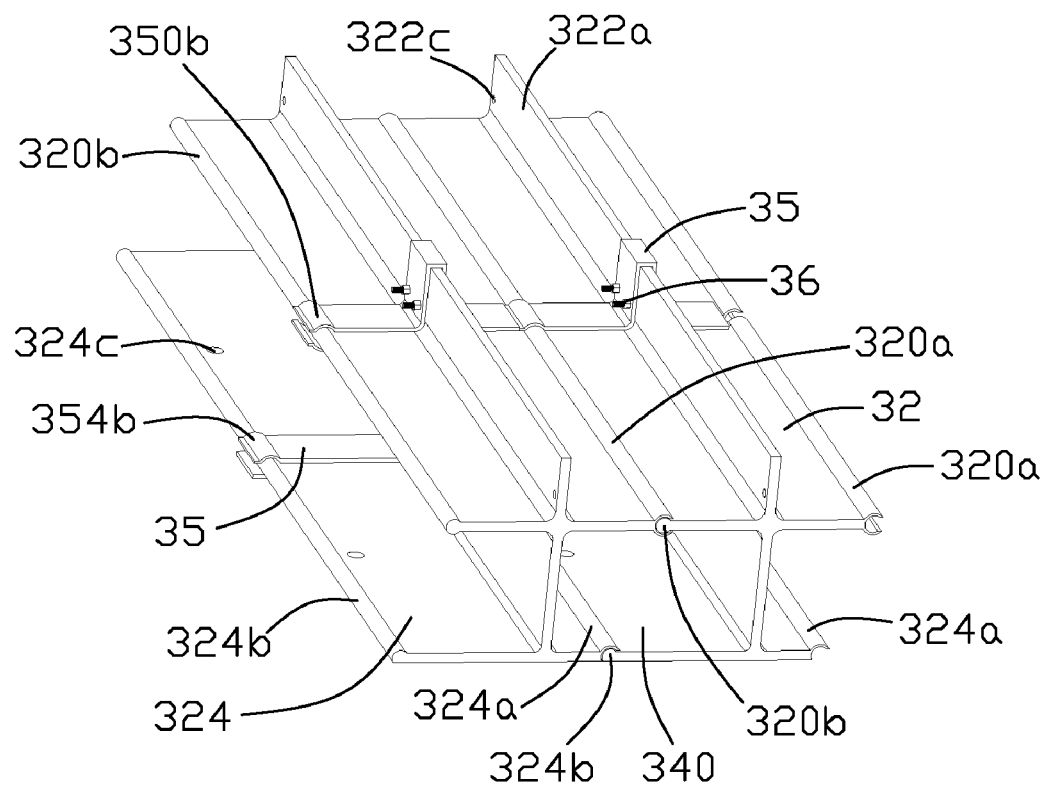
FIG. 3(B) is an assembled, schematic view of four of the heat-absorbing unit in FIG. 3 assembled together.

Referring to FIG. 3(A) and FIG. 3(B), one of the clips 35 used in the air conditioning device 100 and four assembled heat-absorbing units 32 are respectively shown. Each clip 35 comprises a substrate 350 having a similar shape to the heat-absorbing unit 32, and two covers 352 extending vertically from edges of the substrate 350 respectively. The covers 352 and the substrate 350 cooperatively define two grooves 353 in front and rear sides of the substrate 350 respectively. A material of the clip 35 should be softer than the heat-absorbing unit 32 and thus easy to manufacture. The clip 35 can be formed by plastics injection molding. Two mounting holes 352c are defined in sides of the covers 352 positioned corresponding to the mounting holes 322c of the heat-absorbing units 32. To assemble the clip 35 and the heat-absorbing units 32, firstly a front side and a rear side of the two adjacent heat-absorbing units 32 are respectively engaged in the grooves 353 of the clip 35; secondly, two screws 36 extend through the mounting holes 352c, 322c to connect the clip 35 with the two heat-absorbing units 32. Two sockets 350b, 354b are formed from ends of two arms of the clip 35 respectively, corresponding to the fasteners 320a, 320b and the fixtures 324a, 324b. An air hole 354 is defined in a central area of the clip 35, corresponding to the lower support board 322b in height. The adjacent heat-absorbing channels 340 communicate with each other through the air hole 354. Thus, air in the adjacent heat-absorbing channels 340 can be exchanged between the heat-absorbing channels 340. Referring to FIG. 3(B), the four heat-absorbing units 32 are connected with each other in the transverse direction by means of the fasteners 320a engaging with the fasteners 320b and the fixtures 324a engaging with the fixtures 324b, and in the longitudinal direction by means of the clips 35 and the screws 36. The fasteners 320a, 320b and the fixtures 324a, 324b are respectively received in the sockets 350b and the sockets 354b. The sockets 350b, 354b clip tightly over the fastener 320a and the fixture 324a to form a sealed board (not labeled); thus, air in the heat-retention cavities 33 does not become mixed with the heat-absorbing cavities 34.

Figure 4:
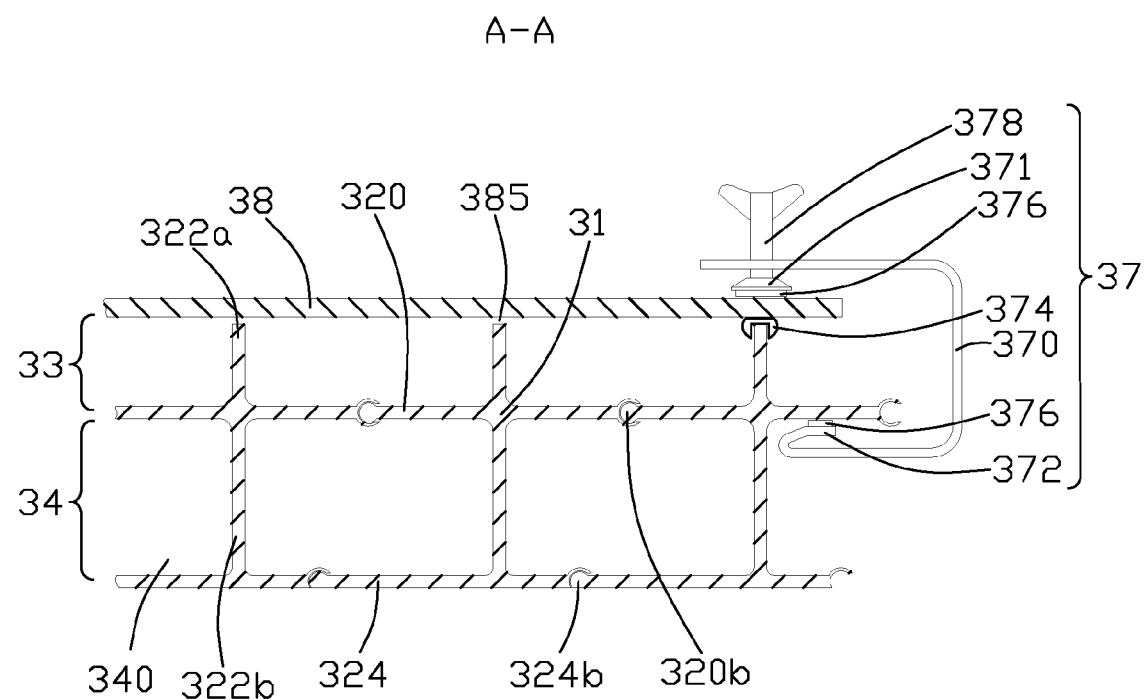
FIG. 4 is a cross-sectional view of the solar air conditioning device configured with a flat transparent panel, taken along section A-A in FIG. 1.
Figure 5:
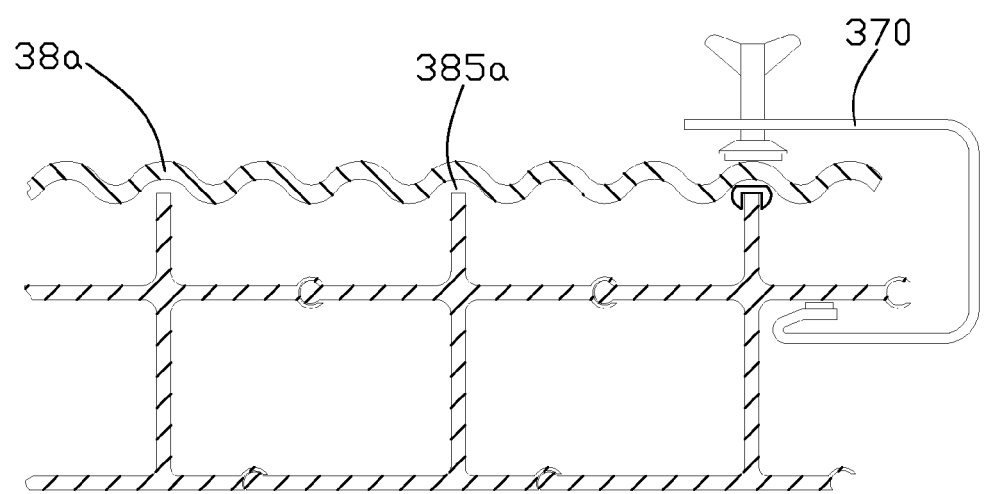
FIG. 5 is a cross-sectional view of the solar air conditioning device configured with a corrugated transparent panel, taken along section A-A in FIG. 1.

Referring to FIG. 4 and FIG. 5, the solar air conditioning devices 100 configured with a flat transparent panel 38 and a corrugated transparent panel 38a are respectively shown. A plurality of air channels (not labeled) are defined in the upper heat-retention cavities 33, which are defined by the transparent panel 38, 38a and the heat-absorbing plates 320. The heat-absorbing channels 340 are defined by the heat-absorbing plates 320 and the bottom boards 324. In order to reduce possible heat loss from the transparent panel 38, 38a, two approaches can be taken. The first approach is to close entrances and exits of the air channels of the heat-retention cavities 33. The second approach is to reduce a height ratio between the upper support boards 322a and the lower support boards 322b. Both of these approaches allow air to be heated mainly in the lower heat-absorbing channels 340. Therefore, since the solar air conditioning device 100 has only one transparent panel 38 or 38a, most air goes through the lower heat-absorbing channels 340 and the device 100 demonstrates excellent heat insulation as well improving heating efficiency.

The transparent panels 38, 38a can improve heat collection and retention of the solar air conditioning device 100 as sunshine can easily radiate through the transparent panel 38 but cannot escape through convection. Thus, solar energy can easily be absorbed by the heat-absorbing units 32 and used to heat air in the heat-absorbing channels 340; thus, the solar air conditioning device 100 has a wide surface for absorbing solar energy.

The solar collector assembly 30 further comprises a plurality of clamps 37. For example, in the solar air conditioning device 100 with the flat transparent panel 38, the clamps 37 are used to connect the transparent panel 38 with the heat-absorbing units 32 and are fastened along two lateral sides of the solar collector assembly 30. Each of the clamps 37 comprises a C-shaped fastener 370, two U-shaped soft beams 374, two gaskets 376 and a handle 378. The C-shaped fastener 370 comprises a pressing portion 371 downwardly extending from a top end thereof and a spring portion 372 upwardly extending from a bottom end thereof. The handle 378 corresponds to the pressing portion 371 and is used to fix the fastener 370 in place.

The transparent panel 38 rests on tops of the clips 35 engaging with the heat-absorbing units 32. The clips 35 should be made of a material which is softer than that of the transparent panel 38. In order to prevent water from entering into the solar collector assembly 30, the heat-absorbing units 32 should be sealed near peripheries of the heat-absorbing set 31 using the U-shaped soft beams 374. Firstly, the U-shaped soft beams 374 are fastened between a bottom of the transparent panel 38 and the upper support boards 322a of the heat-absorbing set 31. A plurality of air gaps 385 are formed between the transparent panel 38 and the upper support boards 322a because tops of the U-shaped soft beams 374 are higher than that of the clips 35. Secondly, the C-shaped fasteners 370 are attached to the lateral upper support boards 322a and press the transparent panel 38 towards the U-shaped soft beams 374, wherein the pressing portion 371 of each C-shaped fasteners 370 abuts against a top of the transparent panel 38 and the spring portion 372 abuts against a bottom of the near lateral heat-absorbing plate 320. Thirdly, locking the handle 378 to attach the C-shaped fasteners 370 firmly to the transparent panel 38 and the heat-absorbing set 31. Furthermore, one of the gaskets 376 is located between the pressing portion 371 and the transparent panel 38, and another the gasket 376 is located between the spring portion 372 and the lateral heat-absorbing plate 320. Thus, mechanical stress on the transparent panel 38 and the heat-absorbing set 31 can be greatly reduced. Moreover, the pressing portions 371 of the C-shaped fasteners 370 can be first attached to a steel bar (not shown); accordingly, the gaskets 376 should be located between the steel bar and the transparent panel 38. Thus, the transparent panel 38 can be supported more uniformly and the heat-absorbing set 31 can have better waterproofing. It should be noted that the gaskets 376 can also be pre-assembled on edges of the transparent panel 38 and cover contacting surfaces between the transparent panel 38 and the pressing portions 371.

Material of the transparent panel 38, 38a can be chosen from a group of glass, fiberglass, and plastic. The material of the transparent panel 38 should be transparent and weatherproof, and easily cut. It is therefore not necessary to attach the transparent panel 38 to a fixed outer frame insulation chamber (not shown) with a fixed envelop of a related solar air conditioning device (not shown). Thus, in the related solar air conditioning device, due to different coefficients of thermal expansion between the transparent panel and the fixed outer frame insulation chamber, components of the related solar air conditioning device tend to deform or break. The solar air conditioning device 100 without the fixed outer frame insulation chamber can avoid the problems described above. The solar collector assembly 30 can be assembled in a horizontal direction or a vertical direction, or an inclined direction.

A bottom of the solar collector assembly 30 is formed by the bottom boards 324 of the heat-absorbing units 32. The solar collector assembly 30 can be secured on a fixed object such as a roof (not shown) or a wall (not shown) by attaching the bottom boards 324 to the roof or the wall. The solar collector assembly 30 can also be fixed on a board (not shown) which is fixed to the fixed object at a distance or an angle. Beneath the heat-absorbing set 31, a heat-insulated layer (not shown) can be installed to prevent the roof from over-heating and reduce heat dissipation from the heat-absorbing set 31. Thus, heat in the heat-retention cavities 33 can be absorbed completely by the heat-absorbing plates 320, and then conducted to airflow in the heat-absorbing channels 340 below the heat-absorbing plates 320. Thus, a heating efficiency of the solar collector assembly 30 can be improved and thermal buoyancy of air increased. Meanwhile, each of the heat-retention cavities 33 communicates with the adjacent heat-retention cavities 33 through the air gaps 385, 385a formed between the upper support boards 322a and the transparent panel 38, 38a. Each of the heat-absorbing cavities 34 communicates with the adjacent heat-absorbing cavities 34 through the air holes 354 defined in the clips 35.

Compared with a related solar collector assembly, the solar collector assembly 30 of the solar air conditioning device 100 including the modular heat-absorbing units 32, have many advantages, such as low packaging costs, small space required for storage and display, simple assembly and simple configuration. Moreover, the solar air conditioning device 100 can be transported easily through and assembled on site. Furthermore, the heat-absorbing units 32 can be designed or assembled according to requirements of users; thus, the solar air conditioning device 100 can be used in many different structures or houses. The solar collector assembly 30 can be extended to a big configuration easily as long as assemble more the heat-absorbing units 32, so that the solar air conditioning device 100 can have large heat-absorbing areas to collect solar energy. In addition, the heat-absorbing units 32 are suitable for mass-production so that the solar air conditioning device is both cheap and high quality.

Figure 6:
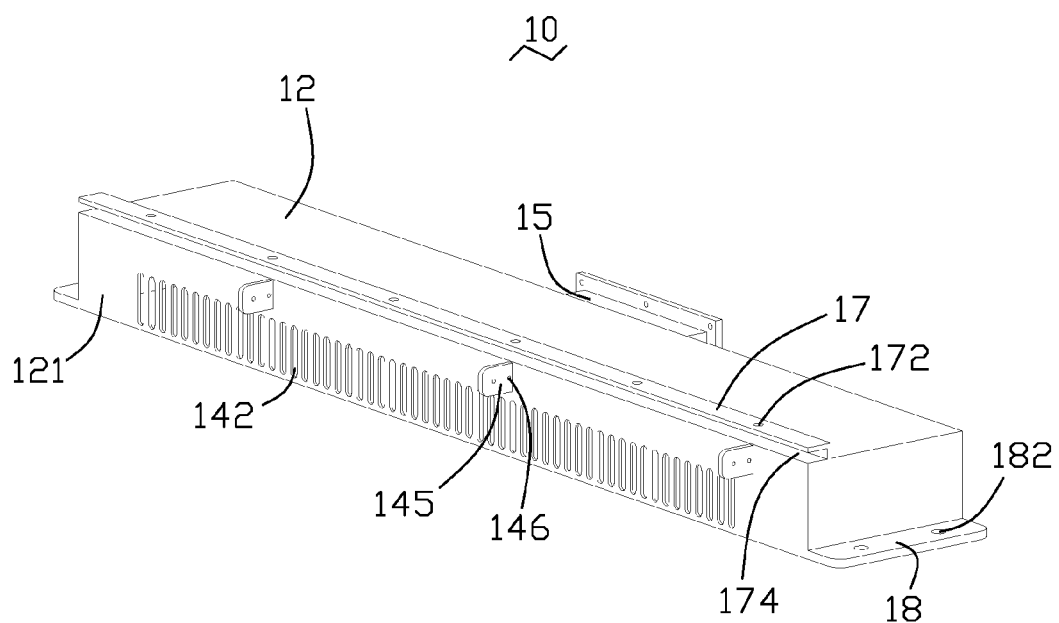
FIG. 6 is a schematic view of an inlet assembly of the solar air conditioning device in accordance with the present invention.
Figure 7:
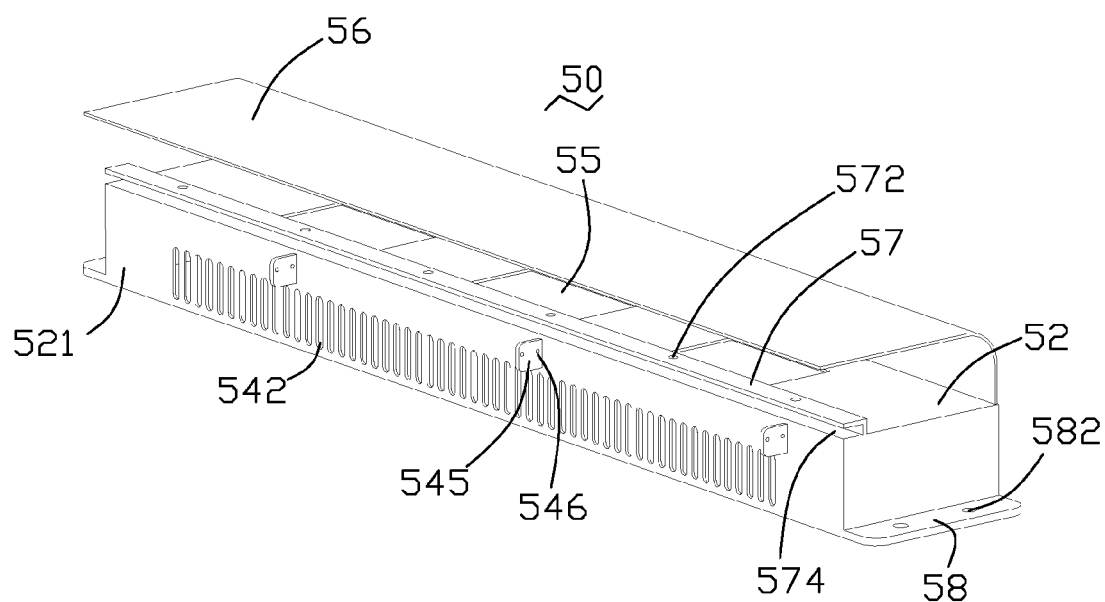
FIG. 7 is a schematic view of an outlet assembly of the solar air conditioning device in accordance with the present invention.

FIGS. 6 and 7 are respectively schematic views of the inlet assembly 10 and the outlet assembly 50 of the solar air conditioning device 100. As shown in FIG. 1, the inlet assembly 10 and the outlet assembly 50 are connected with an entrance (not labeled) and an exit (not labeled) of the solar air conditioning device 100 respectively, as the heat-absorbing channels 340 of the heat-absorbing cavities 34 of the solar collector assembly 30 communicate with the inlet assembly 10 and the outlet assembly 50. The inlet assembly 10 connects to interior exhaust pipes (not shown) and the outlet assembly 50 communicates with exterior. Stale air from the interior can be guided into the heat-absorbing channels 340 through the inlet assembly 10, then heated in the heat-absorbing channels 340 of the solar collector assembly 30, and finally expelled to the exterior through the outlet assembly 50. Meanwhile, cool and fresh air can be guided into the interior through other channels or devices. All in all, the solar air conditioning device 100 is good for health and for saving energy.

Referring to FIG. 2, FIG. 6 and FIG. 7, the inlet assembly 10 has a similar configuration with the outlet assembly 50. The inlet assembly 10 comprises a hollow and rectangular casing 12. The casing 12 has a folding wall 17 extending outwardly from a top portion thereof. The folding wall 17 is near an edge of the top portion of the casing 12 and forms a rectangular groove 174 opening to a front side of the casing 12. A plurality of mounting holes 172 are defined in a top portion of the folding wall 17. The casing 12 is secured to the solar collector assembly 30 by the folding wall 17 and sealed with the transparent panel 38. The casing 12 has a partition 121 in the front side thereof. A plurality of air holes 142 are defined in a lower half portion of the partition 121. The air holes 142 are arranged at predetermined intervals. A plurality of connecting portions 145 extend perpendicularly from an upper half portion of the partition 121. The connecting portions 145 are spaced from each other. Each connecting portion 145 has two mounting holes 146 defined therein. The casing 12 is connected with the heat-absorbing set 31 by extending screws (not shown) through the mounting holes 146 of the connecting portions 145 and the mounting holes 352c of the clips 35 to threadedly engage with nuts (not shown). The connecting manner between the casing 12 and the heat-absorbing set 31 is similar to that between the heat-absorbing units 32 which is clearly shown in FIG. 3 (B). Two connecting projections 18 extend horizontally from a bottom portion of lateral sides of the casing 12. Each of the connecting projections 18 has two mounting holes 182 defined therein. The casing 12 can be secured to a roof, a wall or a fixed board by connecting projections 18. The casing 12 further has a hollow joint 15 in a rear side thereof. The joint 15 is used to connect to the indoor exhaust pipe. The outlet assembly 50 includes similar components to that of the inlet assembly 10, such as a casing 52, a partition 521, air holes 542, connecting portions 545, a folding wall 57, a rectangular groove 574, connecting projections 58 and mounting holes 546, 572, 582. A difference between the inlet assembly 10 and the outlet assembly 50 is that a plurality of rectangular air openings 55 are defined in a top portion of the casing 52 and a waterproof cover 56 extends outwardly from an edge of the top portion of the casing 52. Air in the casing 52 can be exchanged with the exterior through the air openings 55. The waterproof cover 56 covers the top portion of the casing 52 and is used to prevent irritants and pollutants such as, for example, dust or mosquitoes from entering into the casing 52.

When the heat-absorbing set 31 is attached to the inlet assembly 10 and the outlet assembly 50, the upper half portion of the partitions 121, 521 face toward the heat-retention cavities 33 and ensure that air in the heat-retention cavities 33 cannot flow into the inlet assembly 10 or the outlet assembly 50. The air holes 142, 521 in the lower half portion of the partitions 121, 521 communicate with the heat-absorbing channels 340; thus, air can be guided uniformly into the heat-absorbing channels 340 and heat-absorbing efficiency of the solar collector assembly 30 can be greatly improved. In order to reduce airflow resistance, the air holes 142 or the air holes 542 should preferably be twice as large as a cross-sectional area of inner holes of the indoor exhaust pipes.

Figure 8:
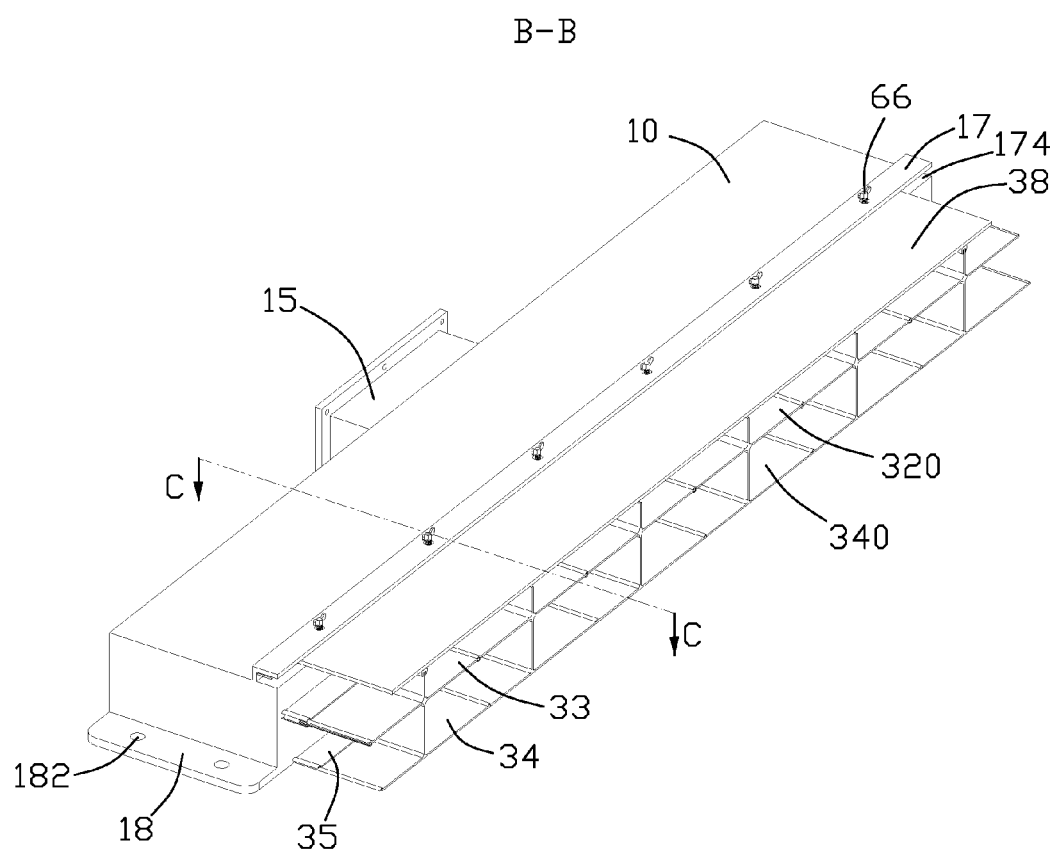
FIG. 8 is an isometric, cross-sectional view of a portion of the solar air conditioning device taken along section B-B in FIG. 1.
Figure 9:
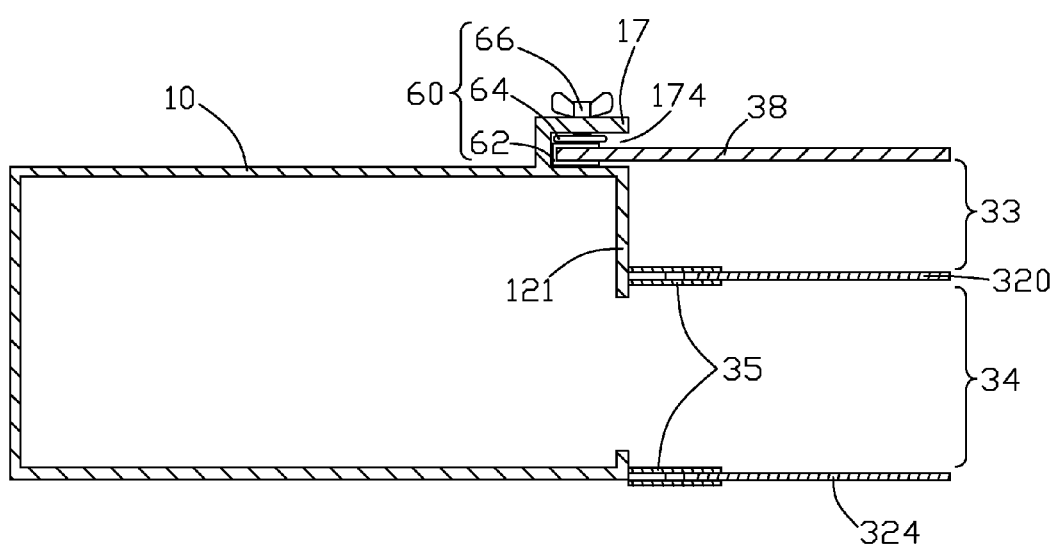
FIG. 9 is a cross-sectional view of the portion of the solar air conditioning device, taken along section C-C in FIG. 8.

FIG. 8 is a schematic view of a partial solar air conditioning device cut along line B-B of the solar air conditioning device 100 of FIG. 1. FIG. 9 is a cross-sectional view of the solar air conditioning device, taken along line C-C of FIG. 8. The inlet assembly 10 and the outlet assembly 50 have an essentially identical waterproof configuration 60 to the transparent panel 38. For example, in the inlet assembly 10, the waterproof configuration 60 between the inlet assembly 10 and the transparent panel 38 comprises a U-shaped soft beam 62, a steel bar 64 and a plurality of screws 66. After the connecting portions 145, 545 are connected to the clips 35 near two ends of the heat-absorbing set 31, the end of the transparent panel 38 covered with the U-shaped soft beams 62 is inserted into the rectangular groove 174; then, the steel bar 64 is inserted into space between the upper portion of the rectangular groove 174 and the U-shaped soft beams 62; then, the screws 66 are inserted through the mounting holes 172 of the folding wall 17 to abut against the steel bar 64 so that the U-shaped soft beams 62 together with the end of the transparent panel 38 are securely attached in the rectangular groove 174. Thus, the waterproof configuration 60 between the inlet assembly 10 and the transparent panel 38 is formed. The waterproof configuration 60 between the outlet assembly 50 and the transparent panel 38 can be attained in a similar way.

Figure 10:
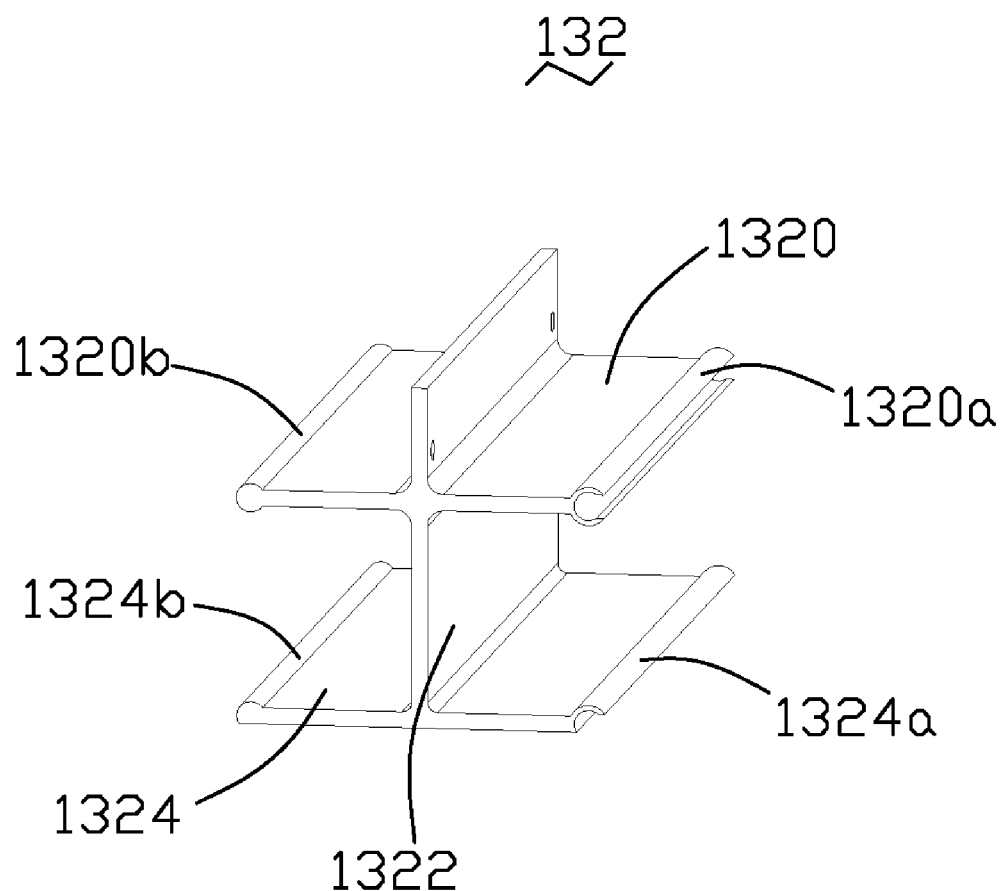
FIG. 10 is a schematic view of a heat-absorbing unit in accordance with the second embodiment of the present invention.

Referring to FIG. 10, a heat-absorbing unit 132 in accordance with the second embodiment of the present invention is shown. The heat-absorbing unit 132 being similar to the heat-absorbing unit 32, comprises two fasteners 1320a, 1320b and two fixtures 1324a, 1324b being similar to the fasteners 320a, 320b and the fixtures 324a, 324b. A difference between the heat-absorbing unit 132 and the heat-absorbing unit 32 is that a heat-absorbing plate 1320 in a side of a support board 1322 has an essentially identical length to a bottom board 1324 on the same side. Although it is not shown in the drawings, it can be readily understood by those skilled in the art that the support board 322 (1322) can have a slantwise orientation, instead of the disclosed vertical orientation.

Figure 11:
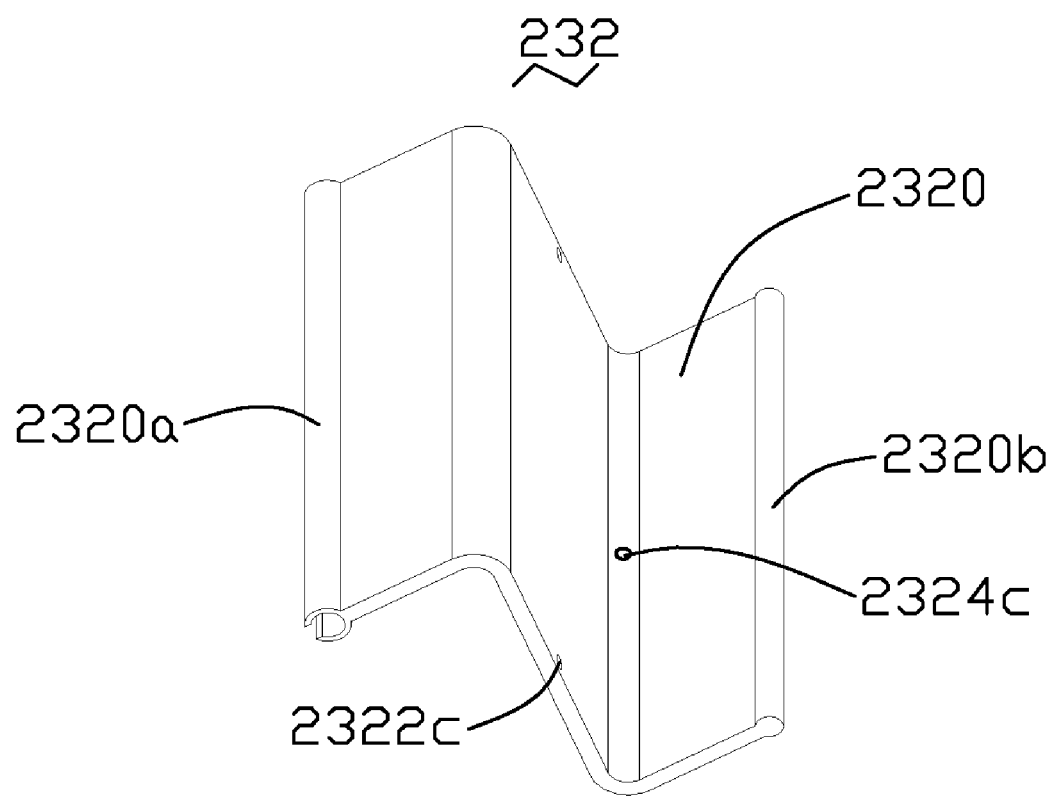
FIG. 11 is a schematic view of a heat-absorbing unit in accordance with the third embodiment of the present invention.
Figure 11A:
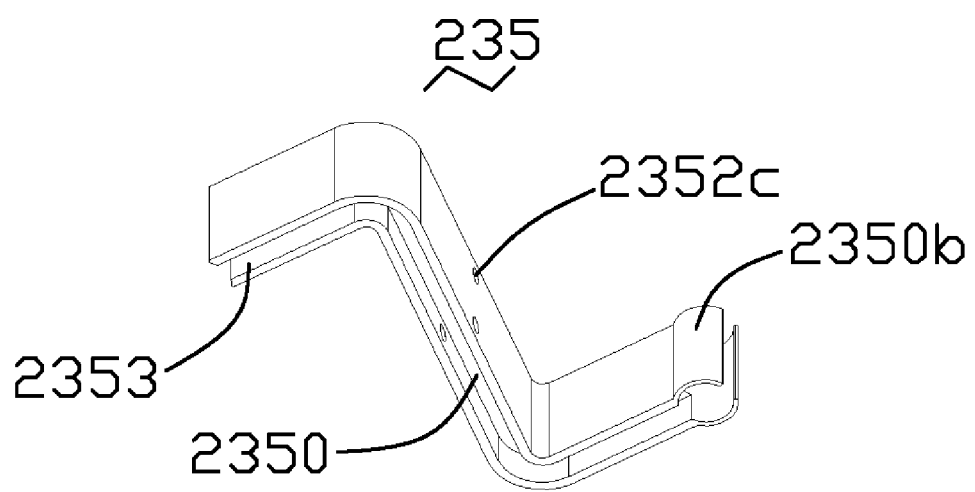
FIG. 11(A) is a clip for engaging with the heat-absorbing unit in FIG. 11.
Figure 11B:
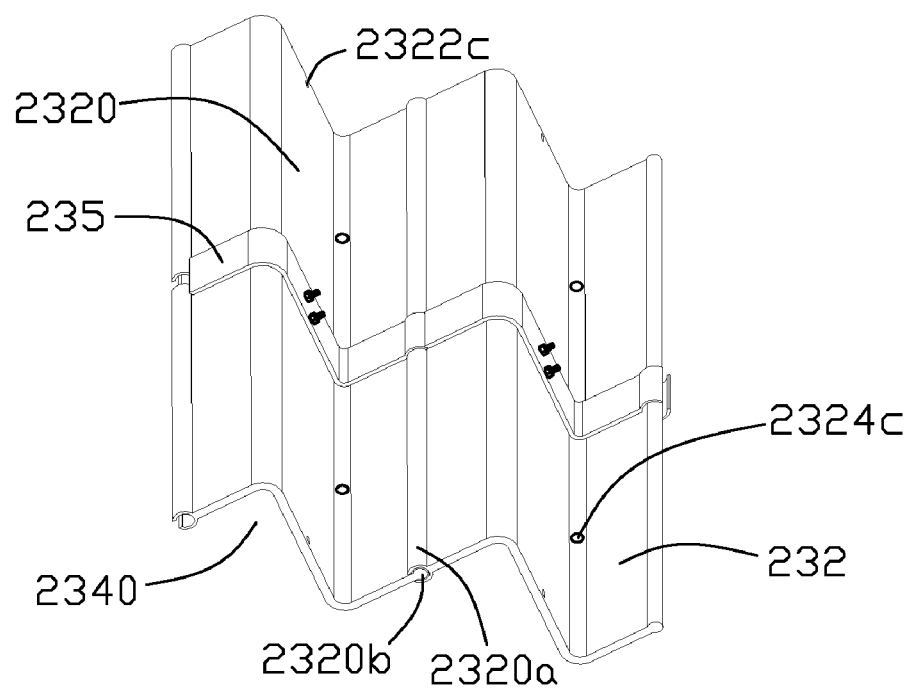
FIG. 11(B) is a schematic view of four of the heat-absorbing unit in FIG. 11 assembled together.

Referring to FIGS. 11 and 11(A), a heat-absorbing unit 232 and a clip 235 for engaging with the heat-absorbing unit 232a in accordance with the third embodiment of the present invention are respectively shown. FIG. 11(B) is an assembled, schematic view of four heat-absorbing units 232 assembled together by two clips 235. Each of the heat-absorbing unit 232 comprises an S-shaped heat-absorbing plate 2320. The heat-absorbing plate 2320 is formed by bending a flat plate. A plurality of angled grooves (not labeled) are defined in the heat-absorbing plate 2320. Two fasteners 2320a, 2320b are formed from two extending ends of the heat-absorbing plate 2320 respectively in the transverse direction. At least one mounting hole 2324c is defined in a bottom of one of the grooves of the heat-absorbing plate 2320 and two mounting holes 2322c are defined in a front and a rear side of the heat-absorbing unit 232 respectively. The fasteners 2320a, 2320b are similar to the fasteners 320a, 320b of the heat-absorbing unit 32. The clip 235 is used to engage with the two heat-absorbing units 232 in the transverse direction. The clip 235 comprises an S-shaped base 2350 being similar to the heat-absorbing unit 23 and two grooves 2353 formed in front and rear sides of the base 2350. The grooves 2353 are used to receive the front and rear sides of the heat-absorbing unit 232. Two mounting holes 2352c are defined in the front and rear sides of the clip 235, corresponding to the mounting holes 2322c of the heat-absorbing unit 232. The clip 235 comprises a socket 2350b similar to the socket 350b. Referring to FIG. 11(B), the two transverse adjacent heat-absorbing units 232 are connected with each other by the fasteners 2320a, 2320b. The two longitudinal adjacent heat-absorbing units 232 are connected with each other by the clip 235. A solar air conditioning device (not shown) using the heat-absorbing units 232 further comprises a transparent panel (not shown) and a shared bottom board (not shown). The transparent panel and the heat-absorbing units 232 form a plurality of upper heat-retention cavities (not shown). The heat-absorbing units 232 and the shared bottom board form a plurality of lower heat-absorbing room (not shown). The heat-absorbing cavities define a plurality of heat-absorbing channels 2340 therein. The solar air conditioning device using the heat-absorbing units 232 has the following advantages: (1) Uses less material, as the heat-absorbing units 232 can be used as a support board; (2) Has high heat-absorption efficiency, as the S-shaped heat-absorbing plate 2320 has a larger surface for absorbing solar energy than the flat heat-absorbing plate 320; (3) Involves fewer manufacture processes, as there is no air hole in the clip 235 of the heat-absorbing unit 232. Due to the transparent panel supported by the clips 235, the upper heat-retention cavities can communicate with each other through gaps between the transparent panel and tops of the heat-absorbing plates 2320. As bottoms of the clips 235 abut against the shared bottom board, the heat-absorbing cavities can communicate with each other through gaps between the heat-absorbing plates 2320 and the shared bottom board.

Figure 12:
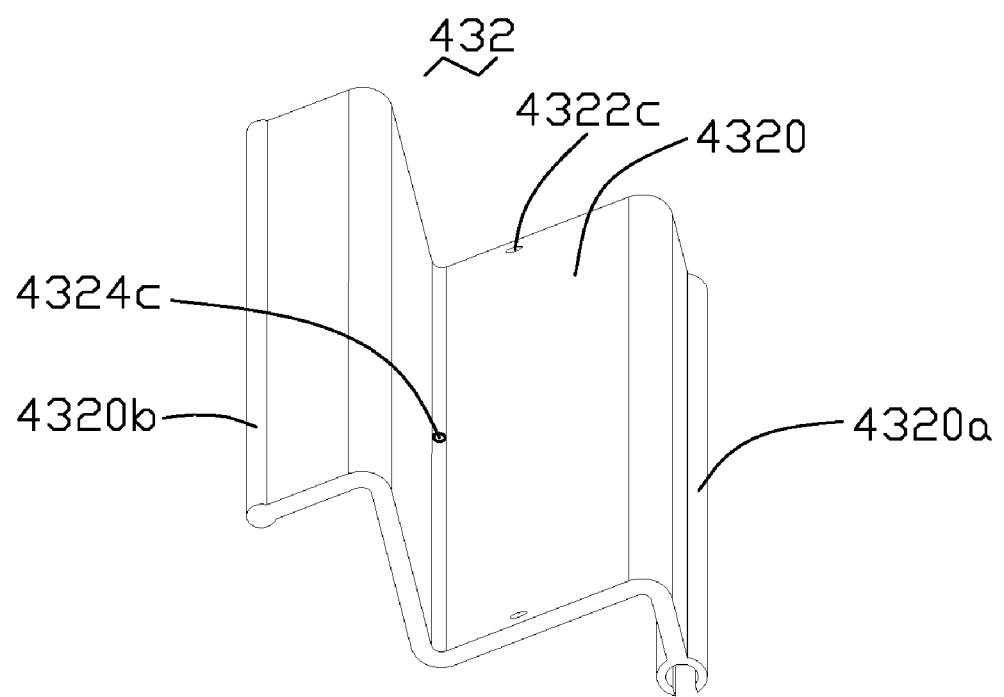
FIG. 12 is a schematic view of a heat-absorbing unit in accordance with the fourth embodiment of the present invention.
Figure 12A:
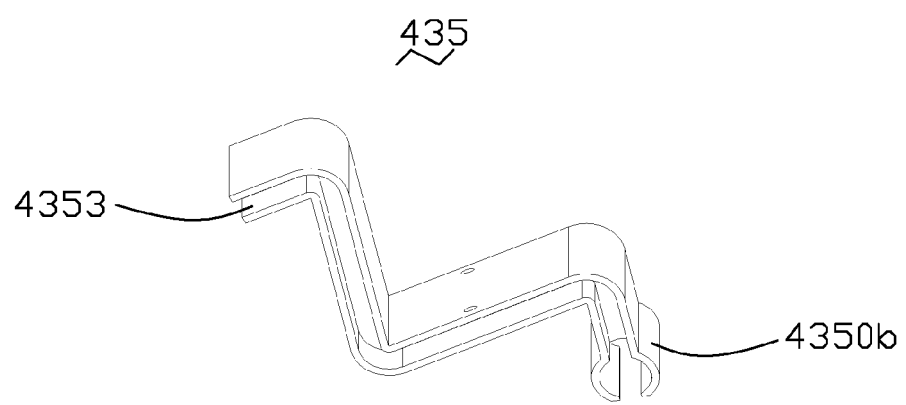
FIG. 12(A) is a clip for engaging with the heat-absorbing unit in FIG. 12.
Figure 12B:
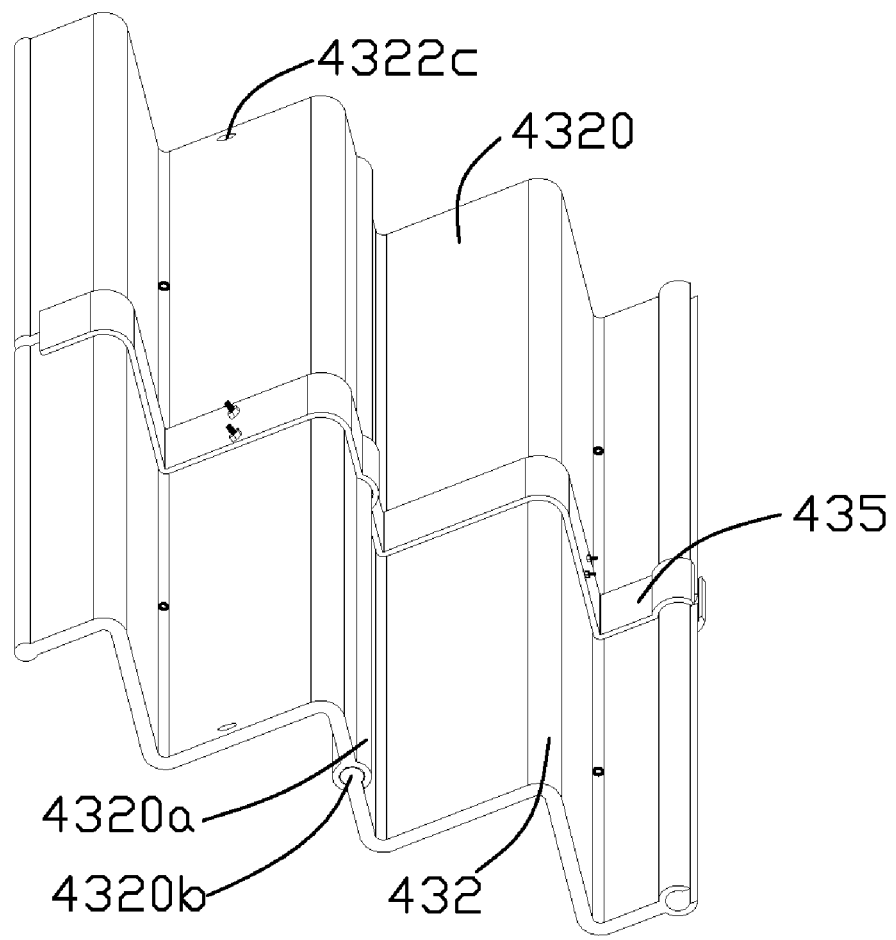
FIG. 12(B) is a schematic view of four of the heat-absorbing unit in FIG. 12 assembled together.

Referring to FIGS. 12 and 12(A), a heat-absorbing unit 432 and a clip 435 for engaging with the heat-absorbing unit 432 in accordance with the fourth embodiment of the present invention are respectively shown. A difference between the heat-absorbing unit 432 and the heat-absorbing unit 232 is that the heat-absorbing unit 432 is M-shaped. The heat-absorbing plate 4320 can be formed by bending a flat plate. Also, the M-shaped heat-absorbing unit 432 can be formed by extending two transverse ends of the heat-absorbing unit 232. Thus, the heat-absorbing unit 432 and the clip 435 respectively comprise a plurality of similar components to the heat-absorbing unit 232 and the clip 235, such as a heat-absorbing plate 4320, two mounting holes 4322c, 4324c, two fasteners 4320a, 4320b, two grooves 4353, a socket 4350b.

In summer, the solar air conditioning device 100 can heat stale air guided from the interior exhaust pipes connecting with a room (not shown) and expel the heated stale air out of the room using thermal buoyancy. At the same time, cool and fresh air from the exterior can be guided into the room, or air from the exterior can be cooled and guided into the room through other devices (not shown) or channels (not shown). Thus, in summer, air in the room can be kept fresh and cool all the time.

In winter, air through the interior exhaust pipes can be heated in the solar collector assembly 30 of the solar air conditioning device 100 and guided to the room via a fan (not shown) connected with the interior exhaust pipes. Furthermore, when fresh air from the exterior is guided to mix with air in the interior exhaust pipes and further heated in the solar collector assembly 30, the inlet assembly 10 should communicate with the interior exhaust pipes and the air openings 55 of the casing 52 should be opened. The fan draws the fresh air through the solar air conditioning device 100 to the indoor room.

The solar air conditioning assembly 100 can be installed with a hot water supply system (not shown) which can operate year-round. A plurality of heat-absorbing water pipes (not shown) are arranged in the heat-retention cavities 33 of the solar air conditioning assembly 100, then heated water is transferred back to a water circulation circuit (not shown) including a heat storage tank (not shown). Meanwhile, air is heated in the heat-absorbing channels 340 of the solar air conditioning assembly 100.

The solar air conditioning assembly 100 in accordance with the present invention has many features that are superior to the related solar air conditioning assemblies. With its modular design, the solar air conditioning assembly 100 provides users with greater compatibility in application as well as more selection and freedom in assembly. The solar air conditioning assembly 100 can be installed in all kinds of structures and vehicles, including ones that are under construction or currently existing ones. The solar air conditioning assembly 100 can be installed horizontally or vertically attached to walls. Furthermore, it can be installed at an angle. The solar air conditioning assembly 100 can also provide excellent heat insulation and protection to the structure.

The heat-absorbing units 32, 132, 232, 432 used in the solar air conditioning assembly 100 can be flexibly expanded as desired to the most optimal absorption surface area to fully absorb and collect heat energy. Therefore, the solar air conditioning assembly 100 does not need a fixed outer frame insulation chamber like the one used in the related solar air conditioning assembly. The solar air conditioning assembly 100 also needs no special consideration for the heat efficiency of each individual unit, as the related models do. One special feature of the solar air conditioning assembly 100 is that although it only has one layer of transparent panel in its structure, because most air goes through the lower heat-absorbing channels 340, the assembly 100 has the excellent insulation effect of a double-glazed system and very high heat-absorption efficiency.

Compared with the related models, the solar air conditioning assembly 100 has a lighter and thinner structure and appearance, and thus it does not cause an overly heavy load to structures. The commercially available flat transparent panel 38 and corrugated transparent panel 38a can maintain the harmony and aesthetics of the existing structures. Furthermore, since the installation of the transparent panels 38, 38a does not have to be glazed into the outer frame of the heat-insulated chamber as one must in the related model, the thermal expansion coefficient of materials used in the solar air conditioning assembly 100 will not cause thermal stress problems related to deformation or cracking.

The solar air conditioning assembly 100 is designed according to a modular concept. Cost of the solar air conditioning assembly 100 is greatly reduced because the heat-absorbing units 32, 132, 232, 432 are made of thin boards and plates. The solar air conditioning assembly 100 is much simpler than related assemblies with whole-unit designs. The assembly not only saves expenses in packaging but also requires less room for display and storage to make channel marketing much easier. The solar air conditioning assembly 100 is very easy to install and maintain such a system. Moreover, users can install and assemble the system by themselves.

What is claimed is:

1. A solar air conditioning device comprising:
   a solar collector assembly, having:
      a heat-absorbing set comprising a plurality of heat-absorbing units, the heat-absorbing units engaging with each other, the heat-absorbing set further comprising a plurality of clips, wherein each of the heat-absorbing units comprises fasteners and fixtures formed from respective lateral sides thereof, the heat-absorbing units are connected with each other via the fasteners and fixtures in a transverse direction, the heat-absorbing units are connected with each other via the clips in a longitudinal direction, wherein the clips have a profile corresponding to the profile of the heat absorbing units and each clip has a hole for transferring air between laterally adjacent heat absorbing units; direction,
      a transparent panel, the transparent panel being assembled to a top of the heat-absorbing set, wherein an air channel is defined between the transparent panel and the heat-absorbing set, and a heat-absorbing channel is defined below the air channel and hermetical from the air channel;
   an inlet assembly installed at an entrance of the solar collector assembly; and
   an outlet assembly installed at an exit of the solar collector assembly, wherein the inlet and outlet assemblies communicate with opposite ends of the heat-absorbing channel, respectively, whereby air can flow from the inlet assembly to the outlet assembly via the heat-absorbing channel and vice versa.

2. The solar air conditioning device as claimed in claim 1, wherein each of the clips comprises a substrate having a similar shape to the heat-absorbing unit, and two covers extending vertically from edges of the substrate respectively, the covers and the substrate cooperatively define two grooves in front and rear sides of the substrate respectively.

3. The solar air conditioning device as claimed in claim 1, wherein each of the heat-absorbing units comprises curved rods and grooves formed from lateral sides thereof, the rods are engaged in the grooves.

4. The solar air conditioning device as claimed in claim 1, wherein each of the heat-absorbing units comprises a heat-absorbing plate, a bottom board and a support board formed from a piece of material.

5. The solar air conditioning device as claimed in claim 4, wherein the support board is vertically connected with the heat-absorbing plate and the bottom board, the heat-absorbing plate in a side of the support board has a different length to that of the bottom board on the same side.

6. The solar air conditioning device as claimed in claim 4, wherein the support board is vertically connecting with the heat-absorbing plate and the bottom board, the heat-absorbing plate in a side of the support board has an essentially identical length to the bottom board on the same side.

7. The solar air conditioning device as claimed in claim 4, wherein the support board is sloping and connecting with the heat-absorbing plate and the bottom board, the heat-absorbing plate in a side of the support board has a different length to that of the bottom board on the same side.

8. The solar air conditioning device as claimed in claim 1, wherein the heat-absorbing units are each manufactured by aluminum extrusion.

\* \* \* \* \*